US008666259B2

(12) United States Patent
Lim et al.

(10) Patent No.: US 8,666,259 B2
(45) Date of Patent: Mar. 4, 2014

(54) DATA TRANSMITTING AND RECEIVING APPARATUS AND METHOD FOR VISIBLE LIGHT COMMUNICATION

(75) Inventors: Sang-Kyu Lim, Daejeon (KR); Il-Soon Jang, Daejeon (KR); Dae Ho Kim, Daejeon (KR); You Jin Kim, Daejeon (KR); Tae-Gyu Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 151 days.

(21) Appl. No.: 13/268,323

(22) Filed: Oct. 7, 2011

(65) Prior Publication Data

US 2012/0087676 A1 Apr. 12, 2012

(30) Foreign Application Priority Data

Oct. 7, 2010 (KR) .......................... 10-2010-0097915
Jun. 23, 2011 (KR) .......................... 10-2011-0061090

(51) Int. Cl.
*H04B 10/00* (2013.01)
*H04B 10/12* (2011.01)
*H04B 10/06* (2011.01)

(52) U.S. Cl.
USPC ........... 398/172; 398/140; 398/182; 398/189; 398/202

(58) Field of Classification Search
None
See application file for complete search history.

(56) References Cited

U.S. PATENT DOCUMENTS

| 2006/0279438 A1* | 12/2006 | Kishi et al. ........................ 341/51 |
| 2007/0024571 A1* | 2/2007 | Maniam et al. ................ 345/102 |
| 2009/0214225 A1 | 8/2009 | Nakagawa et al. |
| 2010/0135673 A1 | 6/2010 | Son et al. |
| 2011/0135317 A1* | 6/2011 | Chaplin ........................ 398/172 |

FOREIGN PATENT DOCUMENTS

| JP | 2006-325085 | 11/2006 |
| KR | 10-2010-0059737 | 6/2010 |

OTHER PUBLICATIONS

S.K. Lim et al, "Technology trends of Visible Light Communication Coupled with LED Illumination", ETRI Brochure & Report, vol. 25. No. 4, Aug. 2010.

* cited by examiner

*Primary Examiner* — Leslie Pascal
*Assistant Examiner* — Casey Kretzer
(74) *Attorney, Agent, or Firm* — Staas & Halsey LLP

(57) ABSTRACT

An apparatus for transmitting data for visible light communication sets up the pulse width control step of pulse width modulation (PWM) in a unit time interval, modulates each symbol of VLC source data input into a PWM signal in accordance with the pulse width control step, generates a visible light modulation signal by controlling the turn-on time or turn-off time of a plurality of light emitting diodes (LEDs) in response to the PWM signal, and transmits the visible light modulation signal.

8 Claims, 14 Drawing Sheets

FIG.6

| 2B | 4B |
|----|------|
| 00 | 0001 |
| 01 | 0100 |
| 10 | 1011 |
| 11 | 1110 |

| 2B | 4B |
|----|------|
| 00 | 0010 |
| 01 | 0111 |
| 10 | 1000 |
| 11 | 1101 |

122b

DATA TRANSMITTING AND RECEIVING APPARATUS AND METHOD FOR VISIBLE LIGHT COMMUNICATION

CROSS-REFERENCE TO RELATED APPLICATION

This application claims priority to and the benefit of Korean Patent Application No. 10-2010-0097915 and 10-2011-0061090 filed in the Korean Intellectual Property Office on Oct. 7, 2010 and Jun. 23, 2011, the entire contents of which are incorporated herein by reference.

BACKGROUND OF THE INVENTION (a) Field of the Invention

The present invention relates to a data transmitting and receiving apparatus and method for visible light communication, and more particularly, to the data transmitting and receiving apparatus and method for visible light communication, which can minimize the brightness reduction and mitigate the flicker of a light source in visible light communication.

(b) Description of the Related Art

Recently, as lighting apparatuses using light emitting diodes (LEDs) as light sources have spread, the visible light communication (VLC) technology for communication using LED lighting apparatuses is being introduced.

The VLC technology is a sort of wireless communication technology that transmits data through the visible light which human eye can detect. The VLC technology is different from the prior art fiber optic communication technology and infrared wireless communication technology in that it utilizes the visible light. Moreover, unlike radio frequency communications, the VLC technology is convenient because it can be freely used without any restriction or permission in terms of frequency use, and is different from other technologies as it offers excellent physical security and enables a user to see a communication link with their eyes.

In a VLC system using LED light sources, a transmitter generally uses the intensity modulation method or the on-off keying (00K) modulation method which varies the intensity of a visible light signal for modulating electrical data "0" and "1" because it is difficult for a receiver to detect the phase information of the transmitted signal and it is rather easy to configure these methods. Moreover, the transmitter of the VLC system using the LED light source may include a coding block for mapping digital data "0" and "1" into signal waveforms of "0" and "1" defined in the system. Depending on the system, non-return-to-zero (NRZ), return-to-zero (RZ), or Manchester code as a coding scheme, has been commonly used.

However, the OOK modulation method has a disadvantage that it drastically decreases the average optical output power of a light source. In other words, assuming that the number of data "0" and the number of data "1" are stochastically equal, the average output power of a visible light signal radiated from the transmitter in the NRZ-OOK or Manchester-OOK method is equal to the optical output power when DC power signal having an amplitude equal to half the amplitude of a data "1" signal is applied to a light source. Also, the average optical output power obtained through the RZ-OOK method is less than that obtained through the NRZ-OOK or Manchester-OOK methods. Of course, when OOK modulation is used, the average optical power of a light source can be increased by substantially increasing the amplitude of a modulation signal or by adding a DC component. However, these methods may cause an excess of allowable values for the LED light source driving and hence can shorten the lifetime of the light source.

Accordingly, when the OOK modulation is applied to the transmitter of the VLC system using the LED light source, it cannot provide the sufficient brightness that an LED light source can emit.

Moreover, VLC using lighting should be flicker-free for eye safety. As used herein, the term "flicker" means the fluctuation of the brightness of light that a human eye can detect. However, the NRZ-OOK and RZ-OOK methods, other than the Manchester-OOK method, may cause the flicker because the brightness of a visible light source representing "1" and "0" differs from each other, and the ratio of patterns "1" and "0" within an arbitrary data transmission slot varies with data combinations.

Among the conventional techniques, the Pulse Position Modulation (PPM) method, which has been actively used in the field of infrared wireless communication, always has the same average brightness of a light source for every symbols, similarly to the Manchester-OOK method. Thus, this method is known to have the flicker mitigation effect. However, the maximum average brightness of a light source that the PPM modulation can offer is no more than 50% at in the case of 2-PPM method which can represent one bit per symbol, and the higher the number of bits per symbol, the lower the maximum average brightness of the light source.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide data transmitting and receiving apparatus and method for visible light communication, which can minimize the brightness reduction of a VLC light source and mitigate the flicker generation of the VLC light source.

An exemplary embodiment of the present invention provides a method for transmitting data in a visible light communication (VLC) apparatus. The transmitting method includes: setting up the pulse width control step of pulse width modulation (PWM) within a unit time interval; modulating each symbol of VLC source data input into a PWM signal in accordance with the pulse width control step; generating a visible light modulation signal by controlling the turn-on time or turn-off time of a plurality of light emitting diodes (LEDs) in response to the PWM signal; and transmitting the visible light modulation signal.

The transmitting method may further include converting the bits of each symbol of input transmission data corresponding to the pulse width control step before the modulation.

The converting may include: if the pulse width control step is $2^m$, splitting the transmission data into m-bit symbols; and converting the m bits into 2m bits, wherein m may be an integer of 2 or more.

The modulating may include mapping the 2m-bit symbols into the PWM signals combined with a PWM signal corresponding to m bits of the 2m-bit symbols within a unit time interval and a PWM signal corresponding to rest m bits of the 2m-bit symbols within a unit time interval.

The conversion of the m bits into 2m bits may include converting the m bits into 2m bits with reference to a bit conversion table that converts the all symbols represented by m bits into the $2^m$ symbols having the same average brightness within two unit time intervals among $2^{2m}$ symbols which can be represented by 2m bits.

Another embodiment of the present invention provides a method for receiving data in a visible light communication apparatus. The receiving method includes: receiving a PWM visible light signal modulated from a visible light communication transmitting apparatus; demodulating the received PWM signal to a symbol; and mapping the symbol to the VLC source data.

The mapping may include converting the bits of the symbol.

If the pulse width control step of the PWM signal is set to the $2^m$ in the visible light communication transmitting apparatus, the symbol may be 2m bits, and the converting may include converting the 2m-bit symbol into an m-bit symbol. Here, m may be an integer of 2 or more.

The converting into the m-bit symbol may include converting the 2m-bit symbol into an m-bit symbol with reference to a bit conversion table that converts the $2^m$ symbols having the same average brightness within two unit time intervals among $2^{2m}$ symbols which can be represented by 2m bits into the symbols represented by m bits.

Yet another embodiment of the present invention provides an apparatus for transmitting data for visible light communication, the apparatus including a setup unit, a bit converter, a modulator, and a lighting source. The setup unit sets up the pulse width control step of pulse width modulation (PWM) within a unit time interval. The bit converter converts the bits of a plurality of symbols corresponding to transmission data in accordance with the pulse width control step. The modulator maps the bit-converted symbols to the corresponding PWM signals, respectively. The lighting source includes a plurality of light emitting diodes (LEDs) and generates a visible light modulation signal by controlling the turn-on time or turn-off time of the plurality of LEDs in response to the PWM signals. The lighting source transmits the visible light modulation signal.

If the pulse width step is $2^m$ the bit converter may split the transmission data into m-bit symbols and then convert the m-bit symbols into 2m-bit symbols, wherein m may be an integer of 2 or more.

The bit converter may include a bit conversion table that converts the all symbols represented by m bits into the $2^m$ symbols having the same average brightness within two unit time intervals among $2^{2m}$ symbols which can be represented by 2m bits.

Yet another exemplary embodiment of the present invention provides an apparatus for receiving data for visible light communication, the apparatus including a receiver, a demodulator, and a bit reverse converter. The receiver receives a PWM visible light signal modulated from a visible light communication transmitting apparatus. The demodulator maps each PWM signal into the corresponding symbol. The bit reverse converter obtains the original source data by converting the bits of the symbol.

If the pulse width control step of the PWM signal is set to the $2^m$ in the visible light communication transmitting apparatus, the demodulator may map the PWM signal to a 2m-bit symbol, wherein m may be an integer of 2 or more.

The bit reverse converter may convert the 2m-bit symbol into an m-bit symbol.

BRIEF DESCRIPTION OF THE DRAWINGS

FIG. 6 and FIG. 7 are views showing another example of the bit conversion tables that converts the m-bit PWM symbols corresponding to the pulse width control step of FIG. 3 to the 2m-bit PWM symbols having the same average brightness within two unit time intervals.

DETAILED DESCRIPTION OF THE EMBODIMENTS

Figure 1:
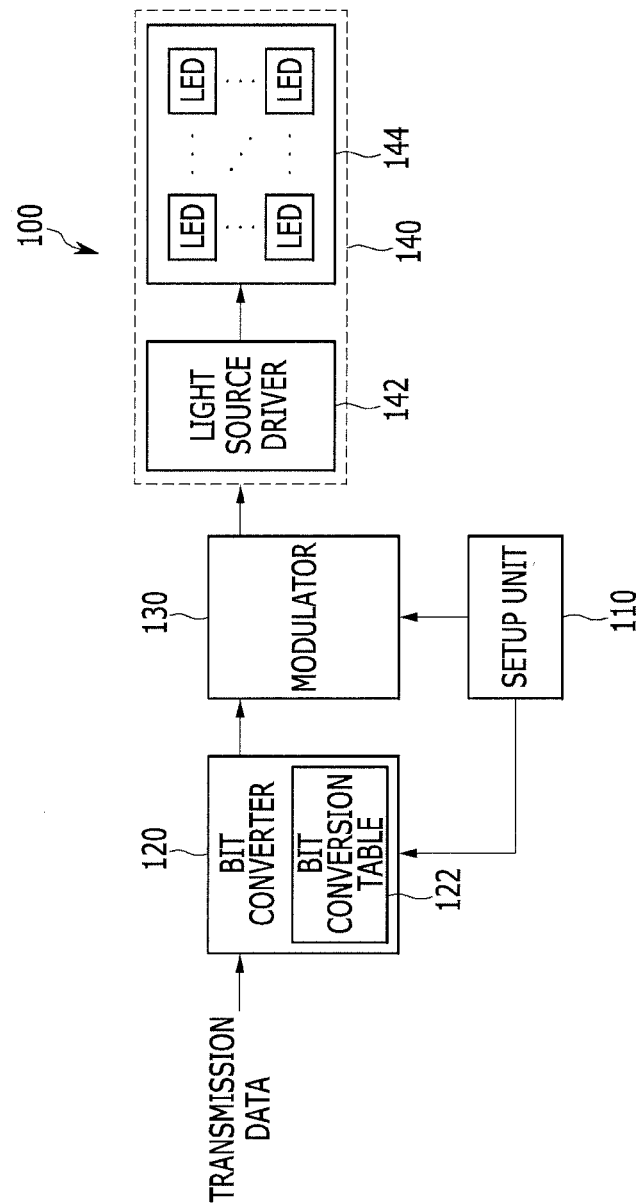
FIG. 1 is a view showing an apparatus for transmitting data for visible light communication according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising", will be understood to imply the inclusion of stated elements but not the exclusion of any other elements.

Now, a data transmitting and receiving apparatus and method for visible light communication according to an exemplary embodiment of the present invention will be described in details with reference to the accompanying drawings.

Figure 2:
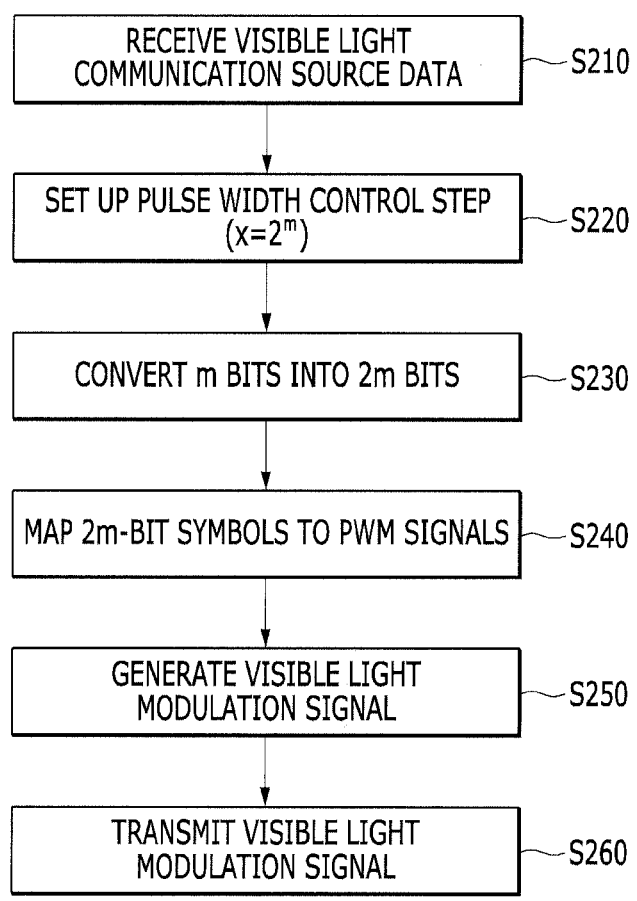
FIG. 2 is a flowchart showing a method for transmitting data by a visible light communication transmitting apparatus according to an exemplary embodiment of the present invention.
Figure 3:
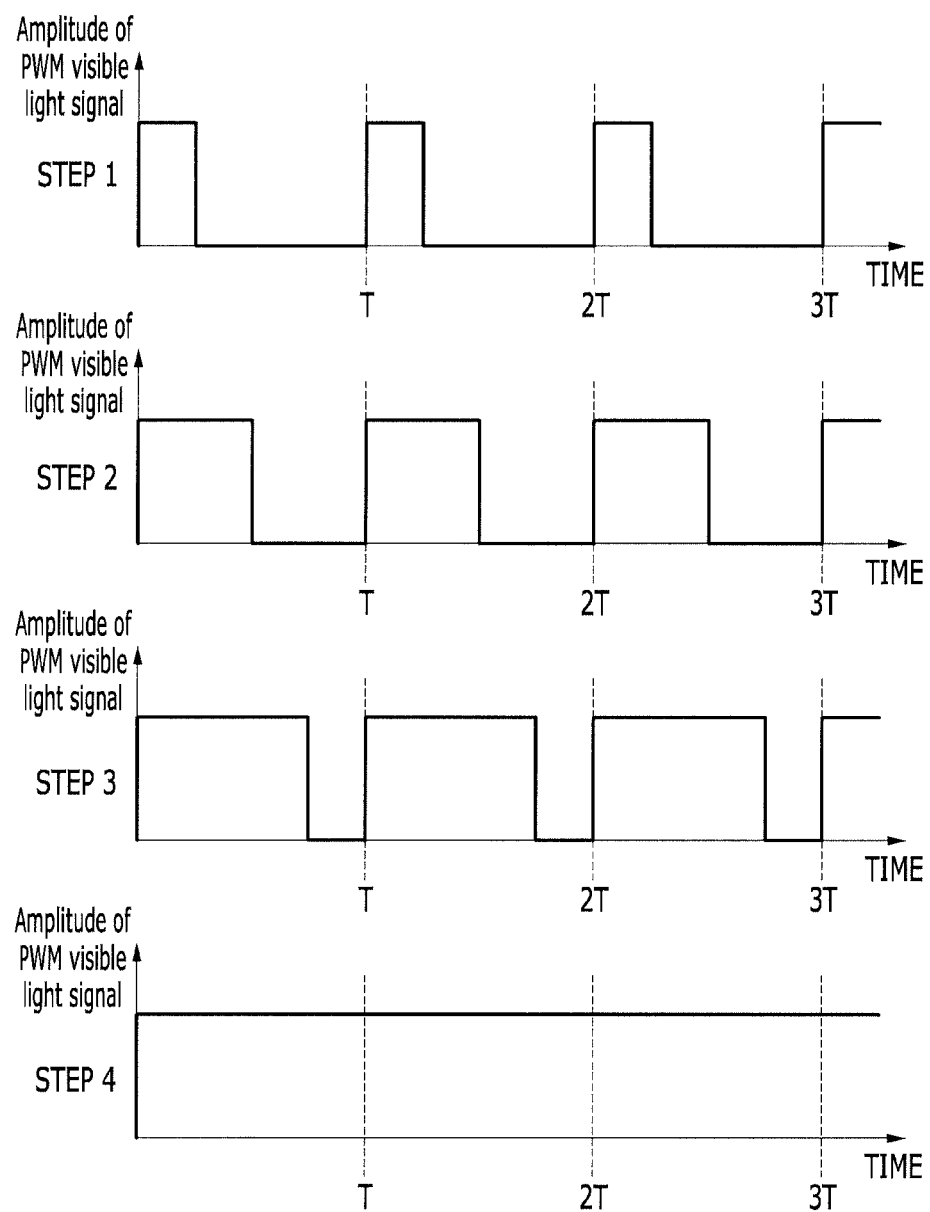
FIG. 3 is a view showing one example of the pulse width control step of PWM according to an exemplary embodiment of the present invention.

FIG. 1 is a view showing an apparatus for transmitting data for visible light communication according to an exemplary embodiment of the present invention. FIG. 2 is a flowchart showing a method for transmitting data by a visible light communication transmitting apparatus according to an exemplary embodiment of the present invention. Further, FIG. 3 is a view showing one example of the pulse width control step of PWM according to an exemplary embodiment of the present invention.

Referring to FIG. 1, the visible light communication transmitting apparatus 100 includes a setup unit 110, a bit converter 120, a modulator 130, and a lighting source 140.

Referring to FIG. 2, visible light communication (VLC) source data is input into the bit converter 120.

The bit converter 120 receives the VLC source data (S210).

Moreover, the setup unit 110 sets up the pulse width control step (x) of pulse width modulation (PWM) within a unit time interval (S220), and transmits the pulse width control step (x) to the bit converter 120 and the modulator 130. For example, the setup unit 110 can set up the pulse width control step (x) in four steps within a unit time interval T. At this point, visible light modulation signals corresponding to the pulse width for each step can be represented as in FIG. 3. That is, the PWM is a modulation method which basically controls the brightness of a light source by changing the width of pulses applied to the light source. When a PWM signal corresponding to a pulse width W is input into the lighting source 140, the waveform of a visible light modulation signal output from the lighting source 140 has a pulse width W during a cycle of time T.

Upon receipt of the VLC source data (S210), the bit converter 120 splits the VLC source data into m-bit symbols, and converts the m-bit symbols into 2m-bit symbols according to a bit conversion table 122 in order to mitigate the flicker caused by VLC modulation (S230). Here, $x=2^m$, and m is an integer of 2 or more.

The bit converter 120 includes the bit conversion table 122 for converting the all $2^m$ symbols, which can be represented by m bits, into 2m-bit symbols. The converted 2m-bit symbols consist of two m-bit symbols in sequence. For example, if the pulse width control step consists of four steps, the bit converter 120 can split the VLC source data in units of 2 bits, and convert 2-bit symbols into 4-bit symbols. The converted 4-bit symbols consist of two 2-bit symbols sequentially. Similarly, if the pulse width control step consists of 16 steps, the bit converter 120 can split the VLC source data in units of 4 bits, and convert 4-bit symbols into 8-bit symbols. The converted 8-bit symbols consist of two 4-bit symbols sequentially.

The modulator 130 maps two respective m-bit symbols in the converted 2m-bit symbols into one of x number of PWM signals to generate a PWM signal (S240), and outputs them to the lighting source 140. If the pulse width control step consists of four steps, four 2-bit symbols are converted into 4-bit symbols and then two respective 2-bit symbols in the converted 4-bit symbols are mapped into one of four PWM signals, respectively. Similarly, if the pulse width control step consists of 16 steps, sixteen 4-bit symbols are converted into 8-bit symbols and then two respective 4-bit symbols in the converted 8-bit symbols are mapped into one of sixteen PWM signals, respectively.

The lighting source 140 includes a light source driver 142 and an LED light source module 144. The light source driver 142 drives the LED light source module 144. The LED light source module 144 may include a plurality of LEDs. The light source driver 142 generates a driving signal for controlling the on and off states of the LEDs and outputs it to the LED light source module 144. The LED light source module 144 is turned on or turned off in response to the driving signal from the light source driver 142, and generates a visible light modulation signal corresponding to the light emitted from the LEDs and transmits it (S250-S260).

Next, the mapping of symbols to PWM signals according to an exemplary embodiment of the present invention will be described in reference to FIG. 4.

Figure 4:
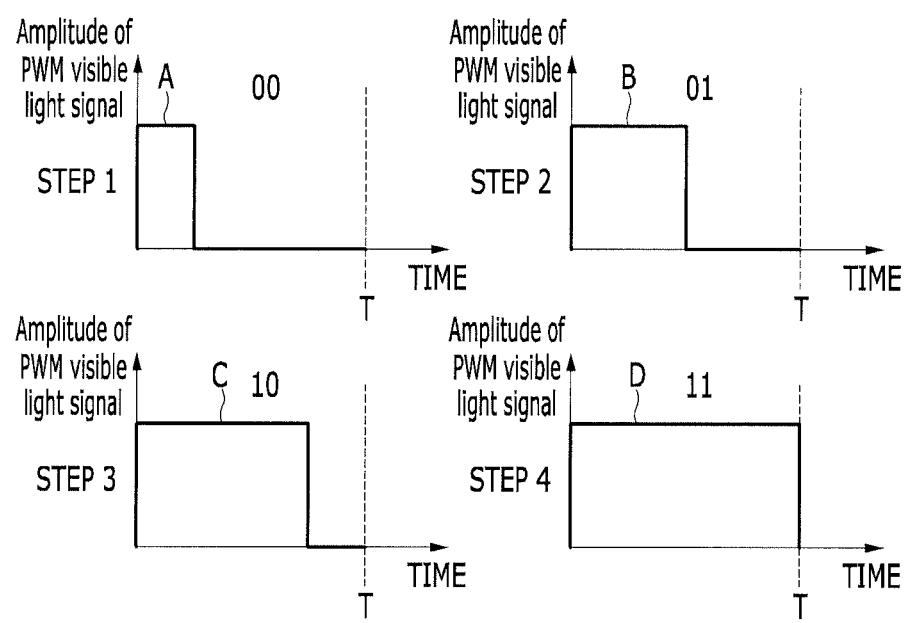
FIG. 4 is a view showing one example of the waveforms of symbols mapped to PWM signals corresponding to the pulse width control step of FIG. 3.

FIG. 4 is a view showing one example of the waveforms of symbols mapped to PWM signals corresponding to the pulse width control step of FIG. 3.

When the pulse width control step (x) is set up in four steps as shown in FIG. 3 within a unit time interval T, the number of symbols which can be represented by four steps of PWM signals may be four: 00, 01, 10, and 11.

These four symbols can be represented, as shown in FIG. 4, by the waveforms of visible light modulation signals of an LED light source. Therefore, the VLC source data split in units of 2 bits, and a total of four symbols, each represented by 2 bits, can be mapped into the PWM signals corresponding to the visible light modulation signals of A to D, respectively.

The symbols mapped to the respective PWM signals shown in FIG. 4 may be different from those of FIG. 4. For example, the PWM signals corresponding to the visible light modulation signals of A to D of FIG. 4 may be sequentially mapped to "01", "10", "11" and "00" or to "10", "11", "01" and "00".

Here, the PWM signals corresponding to 4 symbols have different average brightness within a unit time interval T, and the data split in units of 2 bits is actually randomly input. Thus, as a result, the modulated visible light signals are likely to cause flickering. Therefore, according to an exemplary embodiment of the present invention, the bit converter 120 performs bit conversion as shown in the bit conversion table 122 in order to prevent flickering of the modulated visible light signals.

Figure 5:
FIG. 5 is a view showing one example of a bit conversion table that converts the m-bit PWM symbols corresponding to the pulse width control step of FIG. 3 to the 2m-bit PWM symbols having the same average brightness within two unit time intervals.

FIG. 5 is a view showing one example of a bit conversion table for mapping the m-bit symbols corresponding to the pulse width control steps of FIG. 3 and FIG. 4 into the 2m-bit PWM symbols having the same average brightness within two unit time intervals 2T. That is, FIG. 5 shows the bit conversion table by which a total of four symbols (00, 01, 10, 11) represented by 2 bits are mapped into 4-bit PWM symbols having the same average brightness within two unit time intervals 2T.

Referring to FIG. 5, the bit conversion table 122 stores 4-bit (4B) symbols (0011, 0110, 1001, 1100) corresponding to 2-bit (2B) symbols (00, 01, 10, 11), respectively. At this point, when each of four 2-bits symbols (00, 01, 10, 11) represented by 2 bits corresponding to the PWM visible light signals of A to D in FIG. 4, respectively, the converted 4-bit (4B) symbols (0011, 0110, 1001, 1100) are four symbols having the same average brightness within two unit time intervals 2T, among the sixteen symbols represented by 4 bits.

Accordingly, the bit converter 120 is able to convert the 2-bit symbols (00, 01, 10, 00) into 4-bit symbols (0011, 0110, 1001, 1100), respectively, by the stored bit conversion table 122.

In this way, even if the data split in units of 2 bits is randomly input, the average brightness becomes equal through the bit conversion process in the bit converter 120, thus present invention can mitigate the flicker in VLC.

Figure 6:
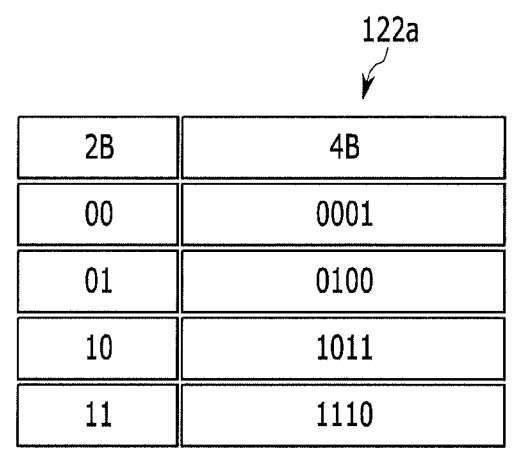
Figure 7:
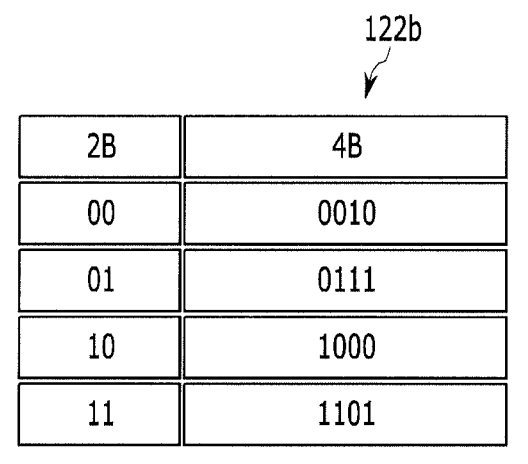

FIG. 6 and FIG. 7 are views showing another example of the bit conversion tables that converts the m-bit PWM symbols corresponding to the pulse width control step of FIG. 3 to the 2m-bit PWM symbols having the same average brightness within two unit time intervals 2T.

FIG. 6 shows the bit conversion table when each of four 2-bit symbols (01, 10, 11, 00) represented by 2 bits correspond to the PWM visible light signals of A to D in FIG. 4, respectively. FIG. 7 shows the bit conversion table when each of four 2-bit symbols (10, 11, 01, 00) represented by 2 bits correspond to the PWM visible light signals of A to D in FIG. 4.

The bit conversion tables 122a and 122b shown in FIG. 6 and FIG. 7 store 4-bit (4B) symbols [(0001, 0100, 1011, 1110) and (0010, 0111, 1000, 1101)] corresponding to 2-bit (2B) symbols (00, 01, 10, 11), respectively. At this point, the converted 4-bit (4B) symbols [(0001, 0100, 1011, 1110) and (0010, 0111, 1000, 1101)] are four symbols having the same average brightness within two unit time intervals 2T, among the sixteen symbols represented by 4 bits.

Figure 8:
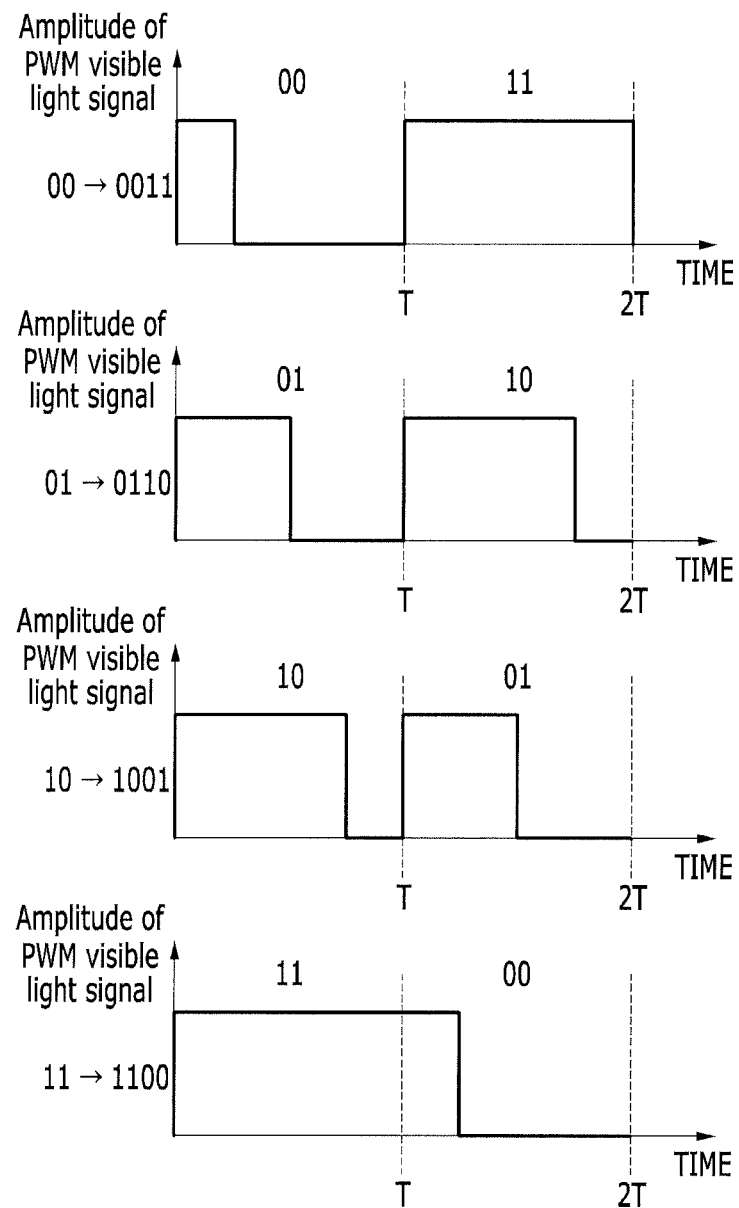
FIG. 8 is a view showing an example of a method for mapping the symbols converted into 4 bits to the PWM signals according to an exemplary embodiment of the present invention.

Also, the result of mapping the 4-bit symbols, bit-converted by the bit conversion table 122 of FIG. 5, to the PWM signals through the modulator 130 may be as shown in FIG. 8.

FIG. 8 is a view showing an example of a method for mapping the symbols converted into 4 bits to the PWM signals according to an exemplary embodiment of the present invention.

The modulator 130 maps the converted 4-bit symbols (0011, 0110, 1001, 1100) to the PWM signals corresponding to the four visible light modulation signals shown in FIG. 8, and outputs the mapped PWM signals to the light source driver 142.

As for the PWM signals corresponding to the four visible light modulation signals shown in FIG. 8, it can be found that the average brightness obtained from the four PWM signals is all the same. Moreover, it can be found that the average brightness within two unit time intervals 2T is more than 50%.

Figure 9:
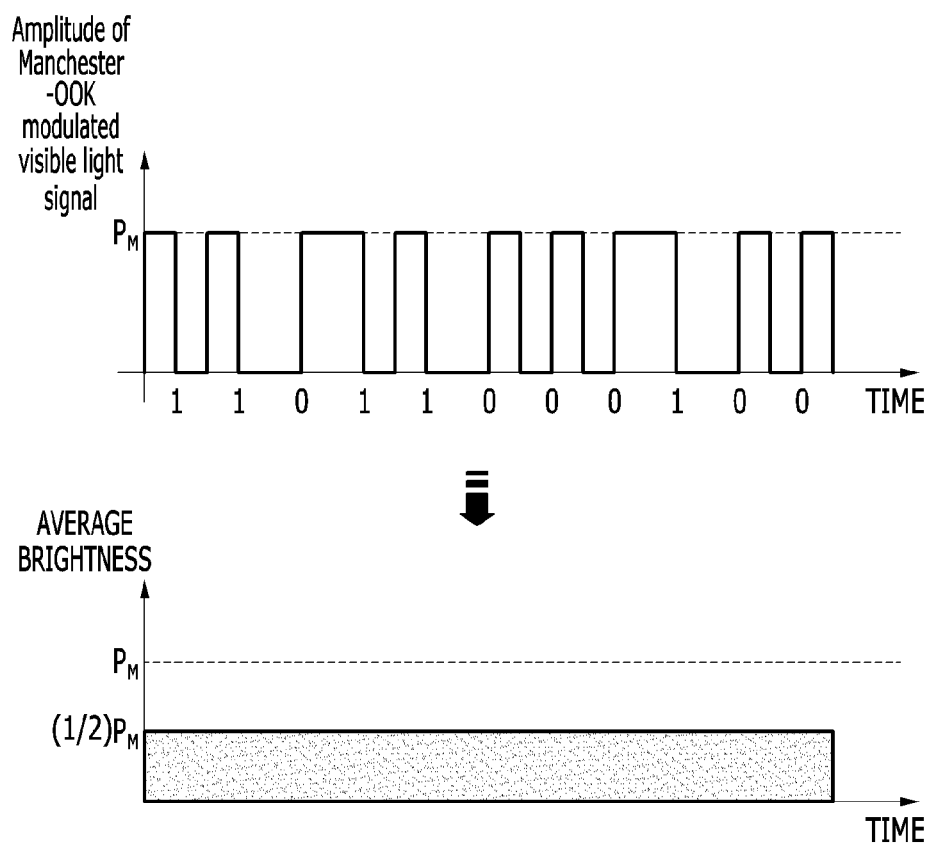
FIG. 9 is a view showing visible light modulation signal waveforms obtained by the conventional Manchester-OOK method and the average brightness thereof.

FIG. 9 is a view showing visible light modulation signal waveforms obtained by the conventional Manchester-OOK method and the average brightness thereof.

Referring to FIG. 9, the average brightness of the visible light modulation signals obtained by the Manchester-OOK method is equal to the brightness obtained when DC power having the amplitude equal to half the amplitude of a data "1" signal is applied to the light source. On the other hand, the bit conversion and PWM method according to an exemplary embodiment of the present invention results in an average brightness of more than 50% within two unit time intervals 2T, so it has the effect of improving the average brightness of an LED light source in visible light communication, as compared to the OOK method or the PPM method.

Another exemplary embodiment of the present invention in which the pulse width control step is set up in eight steps within a unit time interval T will be described briefly with reference to FIGS. 10 to 12.

Figure 10:
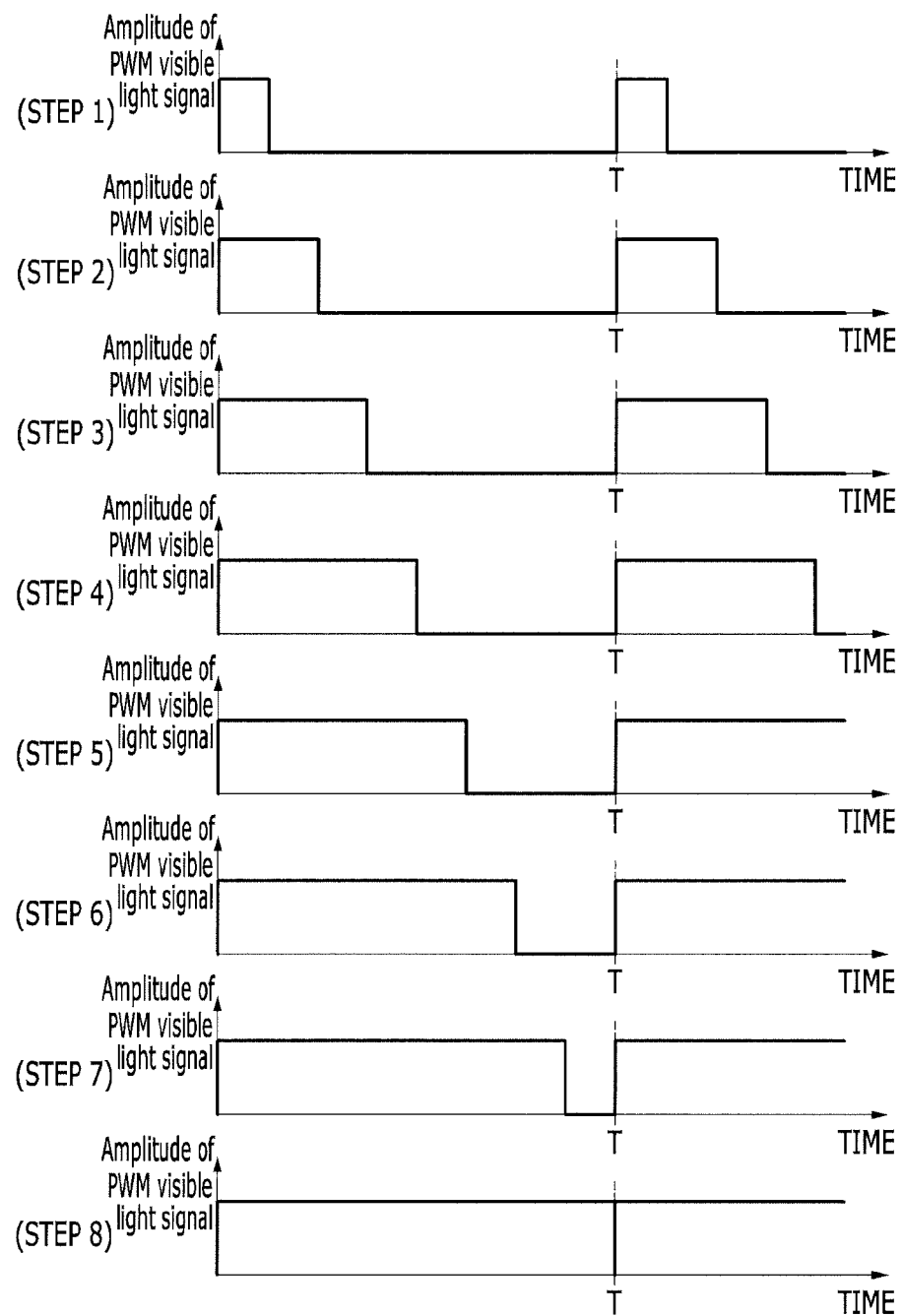
FIG. 10 is a view showing another example of the pulse width control step of PWM according to an exemplary embodiment of the present invention.
Figure 11:
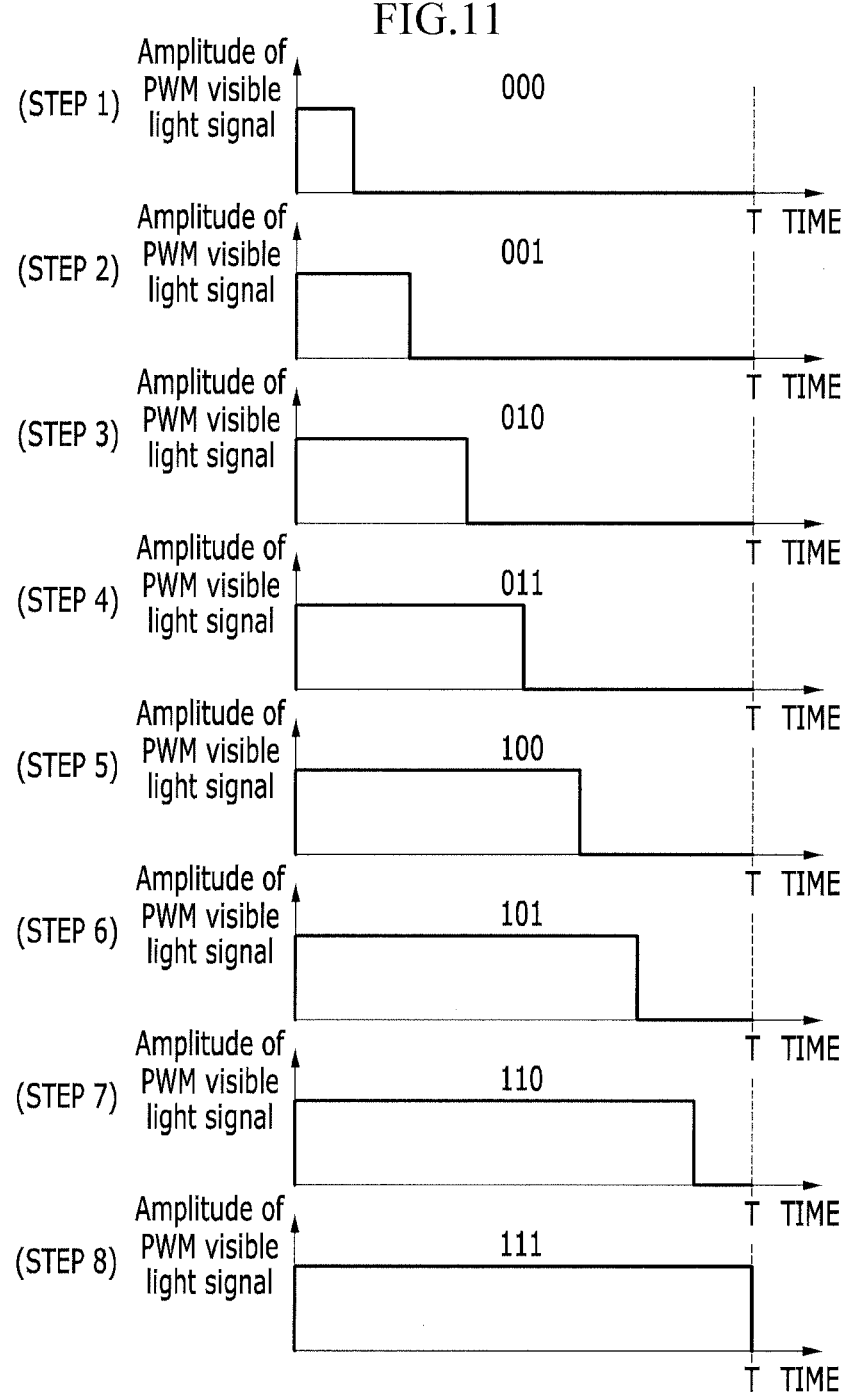
FIG. 11 is a view showing one example of the waveforms of symbols mapped to PWM signals corresponding to the pulse width control step of FIG. 10.

FIG. 10 is a view showing another example of the pulse width control step of PWM according to an exemplary embodiment of the present invention. FIG. 11 is a view showing one example of the waveforms of symbols mapped to PWM signals corresponding to the pulse width control step of FIG. 10. Further, FIG. 12 is a view showing one example of a bit conversion table that converts the m-bit PWM symbols corresponding to the pulse width control step of FIG. 10 to the 2m-bit PWM symbols having the same average brightness within two unit time intervals 2T.

As shown in FIG. 10, the setup unit 110 can set up the pulse width control step (x) of PWM in eight steps within a unit time interval T. When the pulse width control step is set up in eight steps within a unit time interval T, the number of symbols represented by eight steps of PWM signal is 8: 000, 001, 010, 011, 100, 101, 110, and 111. As shown in FIG. 11, the eight symbols (000, 001, 010, 011, 100, 101, 110, 111) can be mapped to the PWM signals corresponding to the respective visible light modulation signals, respectively.

Figure 12:
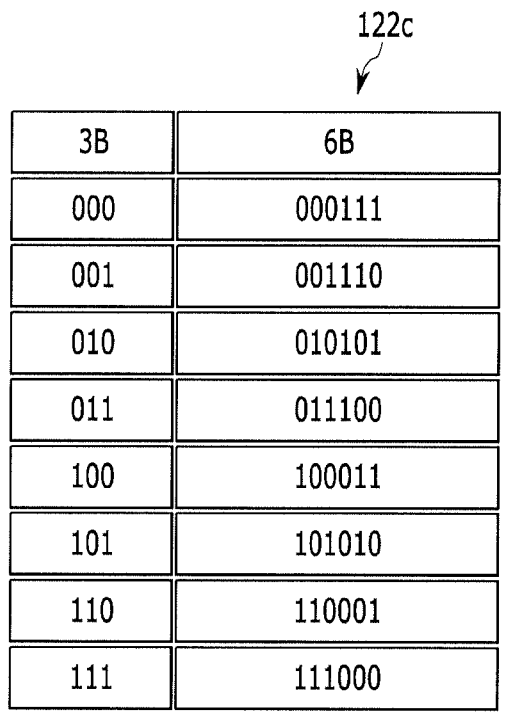
FIG. 12 is a view showing one example of a bit conversion table that converts the m-bit PWM symbols corresponding to the pulse width control step of FIG. 10 to the 2m-bit PWM symbols having the same average brightness within two unit time intervals.

Moreover, the bit converter 120 can split VLC source data in units of 3 bits ($=2^3$), and convert the 3-bit symbols into 6($=2*3$)-bit symbols with reference to the bit conversion table 122c of FIG. 12. Referring to FIG. 12, the bit conversion table 122c also stores eight 6-bit symbols (000111, 001110, 010101, 011100, 100011, 101010, 110001, 111000) having the same average brightness within two unit time intervals 2T, among 64 symbols represented by 6 bits, so as to convert the eight 3-bit symbols (000, 001, 010, 011, 100, 101, 110, 111) into eight 6-bit symbols, respectively.

That is, eight 6-bit symbols (000111, 001110, 010101, 011100, 100011, 101010, 110001, 111000) of the bit conversion table 122c all have the same average brightness within two unit time intervals 2T. Accordingly, even if the data split in units of 3 bits is randomly input, the average brightness within two unit time intervals 2T becomes equal through the bit conversion process in the bit converter 120 and the bit conversion table 122c, thus present invention can mitigate the flicker in VLC. Also, an average brightness of more than 50% within two unit time intervals 2T can be achieved.

Figure 13:
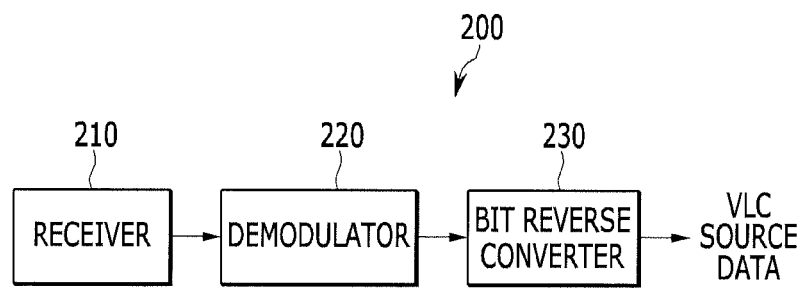
FIG. 13 is a view showing an apparatus for receiving data for visible light communication according to an exemplary embodiment of the present invention.
Figure 14:
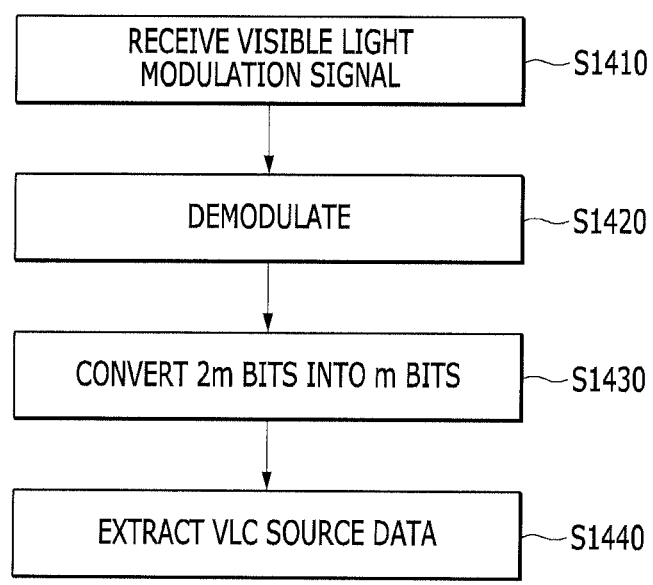
FIG. 14 is a flowchart showing a method for receiving data on the visible light communication receiving apparatus according to an exemplary embodiment of the present invention.

FIG. 13 is a view showing an apparatus for receiving data for visible light communication according to an exemplary embodiment of the present invention. FIG. 14 is a flowchart showing a method for receiving data by the visible light communication receiving apparatus according to an exemplary embodiment of the present invention.

Referring to FIG. 13, the visible light communication receiving apparatus 200 according to an exemplary embodiment of the present invention includes a receiver 210, a demodulator 220, and a bit reverse converter 230.

Referring to FIG. 14, the receiver 210 receives a PWM visible light signal modulated from the visible light communication transmitting apparatus 100 (S1410).

The demodulator 220 performs the reverse process of the modulator 130. The demodulator 220 demodulates the received PWM visible light signal and maps the respective PWM signals within two unit time intervals to their corresponding 2m-bit symbols (S1420).

The bit reverse converter 230 performs the reverse process of the bit converter 120. The bit reverse converter 230 converts the 2m-bit symbols into m-bit symbols and extracts original VLC source data from the reverse converted m-bit symbols (S1430-S1440). The bit reverse converter 230 converts the 2m-bit symbols into m-bit symbols through the reverse process of the bit conversion tables 122, 122a, 122b, and 122c.

According to an exemplary embodiment of the present invention, when a data transmission function for visible light communication is added to a lighting apparatus or a visible light source emitting visible light, present invention allows a PWM modulation method, which is widely used to control the brightness of a light source in a pure LED lamp with only lighting function at present, to be also used for VLC function, and the brightness reduction of the lighting apparatus or visible light source, caused by the modulation operation, can be minimized, as compared to the OOK method or PPM method. Moreover, the flicker which can be generated from the VLC function of the light source can be mitigated.

The above-described embodiments can be realized through a program for realizing functions corresponding to the configuration of the embodiments or a recording medium for recording the program in addition to through the above-described apparatus and/or method, which is easily realized by a person skilled in the art.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting data by a visible light communication (VLC) apparatus, the method comprising:
    setting up a pulse width control step of pulse width modulation (PWM) within a unit time interval;
    if the pulse width control step is $2^m$, splitting the transmission data into m-bit symbols;
    converting the m bit symbols into 2m bit symbols;
    modulating the 2m-bit symbols into PWM signals, with the PWM signals being generated by combining a PWM signal corresponding to m bits of the 2m-bit symbols within a unit time interval and a PWM signal corresponding to a rest of bits of the 2m-bit symbols within a unit time interval;
    generating a visible light modulation signal by controlling the turn-on time or turn-off time of a plurality of light emitting diodes (LEDs) in response to the PWM signals; and
    transmitting the visible light modulation signal,
    wherein m is an integer of 2 or more.

2. The method of claim 1, wherein the converting of the m bit symbols into 2m bit symbols comprises converting the m bit symbols into 2m bit symbols with reference to a bit conversion table that converts the all symbols represented by m bit symbols into the $2^m$ symbols having the same average brightness within two unit time intervals, among 2m symbols which can be represented by 2m bits.

3. The method of claim 1, wherein each of $2^m$ symbols represented by m bits are mapped to $2^m$ PWM signals corresponding to the $2^m$ pulse width control steps within a unit time interval.

4. A method for receiving data by a visible light communication apparatus, the method comprising:
    receiving PWM signals modulated from a visible light communication transmitting apparatus;
    demodulating the PWM signals to 2m-bit symbols; and
    mapping the 2m-bit symbols symbol to the VLC source data,
    wherein the mapping comprises converting 2m-bit symbols to m-bit symbols,
    wherein if a pulse width control step of the PWM signal is set to the 2m in the visible light communication transmitting apparatus, and m is an integer of 2 or more, and
    wherein the converting comprises converting the 2m-bit symbol into an m-bit symbol,
    wherein the PWM signals are generated, by the visible light communication transmitting apparatus, by combining a PWM signal corresponding to m bits of the 2m-bit symbol within a unit time interval and a PWM signal corresponding to a rest m bits of the 2m-bit symbols within a unit time interval.

5. The method of claim 4, wherein the converting into the m-bit symbol comprises converting the 2m-bit symbol into an m-bit symbol with reference to a bit conversion table that converts the $2^m$ symbols having the same average brightness in two unit time intervals among 2m symbols which can be represented 2m bits into the symbols represented by m bits.

6. An apparatus for transmitting data for visible light communication, the apparatus comprising:
    a setup unit that sets up a pulse width control step of pulse width modulation (PWM) within a unit time interval;
    a bit converter that converts bits of a plurality of symbols corresponding to transmission data in accordance with the pulse width control step;
    a modulator that maps the bit-converted symbols to the corresponding PWM signals, respectively;
    a lighting source that comprises a plurality of light emitting diodes (LEDs), and generates a visible light modulation signal by controlling the turn-on time or turn-off time of the plurality of LEDs in response to the PWM signals, and transmit the visible light modulation signal,
    wherein, if the pulse width step is $2^m$, the bit converter splits the transmission data into m-bit symbols and then converts the m-bit symbols into 2m-bit symbols, wherein m is an integer of 2 or more,
    the bit converter comprises a bit conversion table that converts the all symbols represented by m bits into the $2^m$ symbols having the same average brightness within two unit time intervals, among $2^m$ symbols which can be represented by 2m bits, and
    with the PWM signals being generated during modulation by combining a PWM signal corresponding to m bits of the 2m-bit symbols within a unit time interval and a PWM signal corresponding to a rest of bits of the 2m-bit symbols within a unit time interval.

7. The apparatus of claim 6,
    wherein each $2^m$ symbols represented by m bits are mapped to $2^m$ PWM signals corresponding to the $2^m$ pulse width control steps within a unit time interval.

8. An apparatus for receiving data for visible light communication, the apparatus comprising:
    a receiver that receives pulse width modulation (PWM) signals modulated from a visible light communication transmitting apparatus;
    a demodulator that map PWM signals to 2m-bit symbols;
    a bit reverse converter that obtains the original source data by converting the 2m-bit symbols, wherein
    a pulse width control step of the PWM signals is set to the $2^m$ in the visible light communication transmitting apparatus,
    the bit reverse converter converts the 2m-bit symbols into m-bit symbols,
    m is an integer of 2 or more, and
    the PWM signals are generated, by the visible light communication transmitting apparatus, by combining a PWM signal corresponding to m bits of the 2m-bit symbol within a unit time interval and a PWM signal corresponding to a rest m bits of the 2m-bit symbols within a unit time interval.

* * * * *